(12) United States Patent
Römer (10) Patent No.: US 8,248,005 B2
(45) Date of Patent: Aug. 21, 2012

(54) BRAKING CIRCUIT FOR A DOOR ACTUATOR WITH A GENERATIVELY OPERABLE ELECTRICAL MOTOR (75) Inventor: Martin Römer, Breckerfeld (DE)

(73) Assignee: Dorma GmbH + Co. KG, Ennepetal (DE)

( * ) Notice: Subject to any disclaimer, the term of this patent is extended or adjusted under 35 U.S.C. 154(b) by 239 days.

(21) Appl. No.: 12/821,605

(22) Filed: Jun. 23, 2010

(65) Prior Publication Data
US 2010/0320944 A1 Dec. 23, 2010

(30) Foreign Application Priority Data
Jun. 23, 2009 (DE) .................. 10 2009 030 225

(51) Int. Cl.
*H02P 3/22* (2006.01)

(52) U.S. Cl. ........ 318/380; 318/362; 318/381; 318/382; 318/466; 318/465; 361/154; 361/160; 361/36; 361/56; 73/121; 340/457; 340/475; 327/397; 180/15; 180/9.21; 180/9.64; 180/65.8

(58) Field of Classification Search .................. 318/434, 318/466–469, 266, 280–286, 462, 463, 753, 318/461, 608, 293, 362–382; 315/291; 388/811; 105/50; 73/121; 303/20; 340/457, 475; 327/397; 307/10.3, 10.1; 280/735; 180/15, 180/19.3, 9.21, 9.22, 9.64, 65.8
See application file for complete search history.

(56) References Cited

U.S. PATENT DOCUMENTS

| 5,513,058 | A  | * | 4/1996 | Hollenbeck ..................... 361/36 |
| 6,064,165 | A  | * | 5/2000 | Boisvert et al. ............... 318/465 |
| 6,208,497 | B1 | * | 3/2001 | Seale et al. .................... 361/160 |

FOREIGN PATENT DOCUMENTS

| DE | 10 2004 059 843 |    | 12/2005 |
| DE | 10 2005 028 057 |    | 12/2006 |
| WO | WO 2006133689 | A1 * | 12/2006 |

* cited by examiner

Primary Examiner — Bentsu Ro
Assistant Examiner — Jorge Carrasquillo
(74) Attorney, Agent, or Firm — Cozen O'Connor (57) ABSTRACT A braking circuit is adapted to supply generatively produced energy of the motor as load resistance to a bipolar transistor. The braking circuit has a voltage regulator, which controls a voltage, applied to the base terminal of the bipolar transistor to achieve an associated controlled voltage based on a reference voltage. A first power supply connector of the electrical motor, in the generator mode of operation of the electrical motor, is coupled to a collector terminal of the bipolar transistor and to the voltage input of a voltage regulator. A second power supply connector of the electrical motor is coupled to an emitter terminal of the bipolar transistor and is coupled to a reference input of the voltage regulator via a resistive branch including at least one electrical resistor.

10 Claims, 4 Drawing Sheets

BRAKING CIRCUIT FOR A DOOR ACTUATOR WITH A GENERATIVELY OPERABLE ELECTRICAL MOTOR

BACKGROUND OF THE INVENTION

1. Field of the Invention

The invention relates to a braking circuit for a door actuator with a generatively operable electrical motor. "Door actuator" includes both door closers and door operators, namely swing leaf drives, sliding door drives, revolving door drives, or the like, having an electrical motor which is generatively operated in at least one direction of movement of a connected door leaf.

2. Description of the Related Art

Door operators, in which an electrical motor is generatively operated for closing a connected door leaf, are known for example from the document DE 10 2004 059 843 B3.

Two braking circuits are known from the document DE 10 2005028 057 A1.

According to a first variant, diodes, coupled to each other in series, are utilized as load resistance, the forward directions of the diodes having one and the same current direction. Some diodes have switches coupled in parallel. When closing the respective current circuit by the associated switch, the diode coupled in parallel is shunted and thus its electrical (partial load) resistance is turned off. The braking effect or attenuation effect, generated by the diodes, can thereby be modified, increased in the present case. A disadvantage is that the braking effect, respectively the attenuation effect, can only be modified in stages. This may result in unwanted jerky movements of the connected door leaf. In addition, the diodes, with regard to their breakdown voltage, are dependent on temperature, a circumstance which is disadvantageous in outside installed door operators.

According to one embodiment, the braking circuit realized is by a field-effect transistor, the drain and source terminals thereof, in the generator mode of operation, coupled to corresponding connectors of the electrical motor. The gate terminal of the field-effect transistor is coupled to a center tap of a voltage divider, which is coupled in parallel to the drain-source section of the field-effect transistor. In the resistive branch of the voltage divider, coupled in parallel to the gate-source section of the field-effect transistor, the voltage divider has resistors which can be switched on or switched off by switches. Field-effect transistors are disadvantageous in that they present a relatively high minimum gate-source voltage, which limits their application range with low generator voltages.

SUMMARY OF THE INVENTION

An object of the invention is to at least reduce the shortfalls of the state-of-the-art.

According to one embodiment of the invention, a braking circuit is provided for a door actuator, which is adapted to influence a movement of a connected door in at least one direction of movement and has at least one electrical motor. When generatively operating the electrical motor in a first direction of operation of the electrical motor, opposite to the one direction of movement, the braking circuit is adapted to supply the generatively produced energy of the motor as load resistance to a bipolar transistor. In this case, the first direction of operation preferably corresponds to the closing direction of the connected door.

The bipolar transistor has the advantage that it is possible to enable the collector-emitter section thereof by a base-emitter voltage which is considerably lower compared to the field-effect transistor. Thereby, a functioning of the circuit is possible even at lower generative voltages.

When generatively operating said electrical motor, its produced voltage depends on the revolutions/min respectively the speed of the rotor of the electrical motor at the stator, at the cage of the electrical motor. The higher this speed, the higher the generatively self-induced or generatively produced voltage.

Due to utilizing a bipolar transistor, enabling the collector-emitter section thereof can be realized, and thus a braking effect, respectively an attenuation effect can be achieved, even if the door moves very slowly, which leads to a very low voltage at the electrical motor. In a field-effect transistor the attenuation effect occurs only at a considerably higher speed of the rotor and thus of the connected door, and therefore it can hardly be utilized at slower opening speeds, or cannot be utilized at all.

Furthermore, the braking circuit has a voltage regulator, which controls a voltage applied to the base-terminal of the bipolar transistor, according to a predetermined control voltage based on a reference voltage. Due to the almost constant internal resistance of the voltage regulator, it also controls the current strength applied to the bipolar transistor.

The voltage regulator comprises a reference input for applying said reference voltage, a voltage input for applying the generatively produced voltage and an output for outputting the controlled voltage.

In the generator mode of operation of the electrical motor, a first power supply connector of the electrical motor is coupled to the collector terminal of the bipolar transistor, to the power supply input of the voltage regulator, and, via a first resistive branch, to the reference input of the voltage regulator. In the generator mode of operation, a second power supply connector of the electrical motor is coupled to the emitter terminal of the bipolar transistor. The first resistive branch comprises at least one electrical resistor. Thus, a closed braking circuit is formed.

In addition to an extremely simple structure, this type of braking circuit, without any special additional measures, has an advantage of achieving a braking effect, respectively an attenuation effect opposite the direction of movement of the door, already at very low rates of motion of the door. This circuit is very cost effective and robust. In addition, the bipolar transistor has the advantage that an increase of the generatively produced voltage does not affect, or hardly affects the maximum possible collector-emitter current in the bipolar transistor, and thus does not adversely affect the braking behavior and the attenuation behavior. In addition, the voltage regulator achieves that the bipolar transistor is always fed a necessary (basic) operating voltage.

Preferably, the first resistive branch, as a first voltage divider section, is a component of a voltage divider. The voltage divider is coupled in parallel to the collector-emitter section of the bipolar transistor, to input the desired reference voltage at the reference input. A center tap of the voltage divider is thus coupled to the reference input of the voltage regulator. Thus the voltage regulator has a predetermined voltage, via which an associated current strength is applied to the base terminal of the bipolar transistor. Thus, via the center tap, the first voltage divider section is coupled in series to a second voltage divider section of the voltage divider. Thereby, a portion of the generatively produced energy is absorbed via a second voltage divider section of the voltage divider and thus a certain type of basic braking effect, a basic attenuation effect, is achieved. The voltage regulator and the bipolar transistor serve to principally absorb the remaining generatively produced energy in a controlled manner. Thus, on account of absorbing a portion of the generatively produced energy, the voltage divider likewise protects the bipolar transistor, at least partially, against overload, a circumstance which increases the safety of operation.

The second voltage divider section preferably comprises a second resistive branch with a switch and with an electrical resistor coupled in series to the switch. It is thereby possible to switch on the braking effect or to switch it off, depending on the opening position of the connected door, to reduce or to increase the braking effect. The switch can be configured for example as a normally open contact and is preferably operated in a region near the closed position of the connected door such that it closes the electrical circuit and thus switches on the resistor of this second resistive branch, which resistor is coupled in series to the switch. In the present case, the braking effect, respectively the attenuation effect of the braking circuit is reduced.

The second voltage divider section comprises preferably at least one additional resistive branch coupled in parallel to the second resistive branch. Having several resistive branches allows for providing additional (load) resistors in the second voltage divider section, which resistors preferably cannot be switched off, to achieve the above mentioned basic braking effect and basic attenuation effect. In addition, the above described solution with a normally open contact, once the electrical circuit is closed, achieves the result of a lower overall resistance in the second voltage divider section. This leads to the fact that the voltage divider can absorb more braking energy and thus a lower reference voltage is applied to the reference input, resulting in a lower base current. The collector-emitter current is thereby reduced, leading to an increase in the (partial) load resistance generated by the bipolar transistor, which results in a lower dampening of the movement of the connected leaf. Thereby, a final latching solution is provided near the closed position of the door; having less resistance opposed to the closing motion of the door. However, the reversed operation is possible as well. By utilizing a switch functioning in the reversed direction, the braking of the connected door near the end position can be increased, in order to further reduce the potential risk for individuals who wish to pass the door.

If the door actuator is a door closer or a swing leaf drive, wherein the electrical motor is generatively operated when closing the connected door, during the closing procedure, the above mentioned braking resistance or dampening resistance is opposed to the action of a usually provided closer spring. Shortly prior to reaching the closed position, the braking resistance is reduced on account of an above mentioned enabled electrical resistor, such that the closer spring is able to transmit more closing force onto the door leaf to be closed and can thus move it with higher closing force into the final closed position.

Preferably, at least one of the resistive branches of the voltage divider has an adjustable resistor. The braking circuit can thus be adapted to the circumstances, respectively the requirements of the door leaf connected to the respective door actuator.

Advantageously, the at least one adjustable resistor is thus configured as a potentiometer. Potentiometers offer the possibility to be disposed on, at or in a housing of the door actuator such as to be adjusted from the outside.

Preferably, in addition a fusegear is coupled in parallel to the collector-emitter section of the bipolar transistor. Such a fusegear serves the purpose of preventing the bipolar transistor from "fusing", if it were to be supplied with an excessive collector-emitter voltage.

Preferably, the fusegear comprises two Zener diodes, which are coupled in series to each other with their forward directions being opposed to each other. The current flow is blocked in both current directions. Zener diodes have the advantage of switching through, starting when a so-called breakdown voltage is applied, in reverse direction of the respectively Zener diode, such that the current can flow in the reverse direction of this Zener diode. In this case, the current does not flow across the bipolar transistor. Thereby, even though the braking effect, respectively the dampening effect increases abruptly, the bipolar transistor cannot be destroyed, which increases the safety of operation.

Another embodiment circuit for this type of door actuators comprises one of the above mentioned braking circuit species and in addition a driving circuit, which is adapted to operate the electrical motor of the door actuator in the motor mode of operation, in a second direction of operation, which is opposite to the first direction of the operation. The door actuator becomes a door operator, which moves the connected door leaf into a direction of movement corresponding to the second direction of operation, for example the opening direction. Furthermore, the circuit comprises a switch-over device, which in turn is adapted to switch over from the drive circuit to the braking circuit. With regard to the above mentioned example, the circuit is able to prevent generative braking effect, when opening the door leaf (in the motor mode of operation), and to enable the braking effect, when closing the door leaf.

The door actuator has an electrical motor which is generatively operated in a first direction of operation. Furthermore, such a door actuator has one of the above mentioned circuits.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Further features and advantages of the invention will become apparent from the following description of preferred embodiments, in which.

DETAILED DESCRIPTION OF THE PRESENTLY PREFERRED EMBODIMENTS

Figure 1:
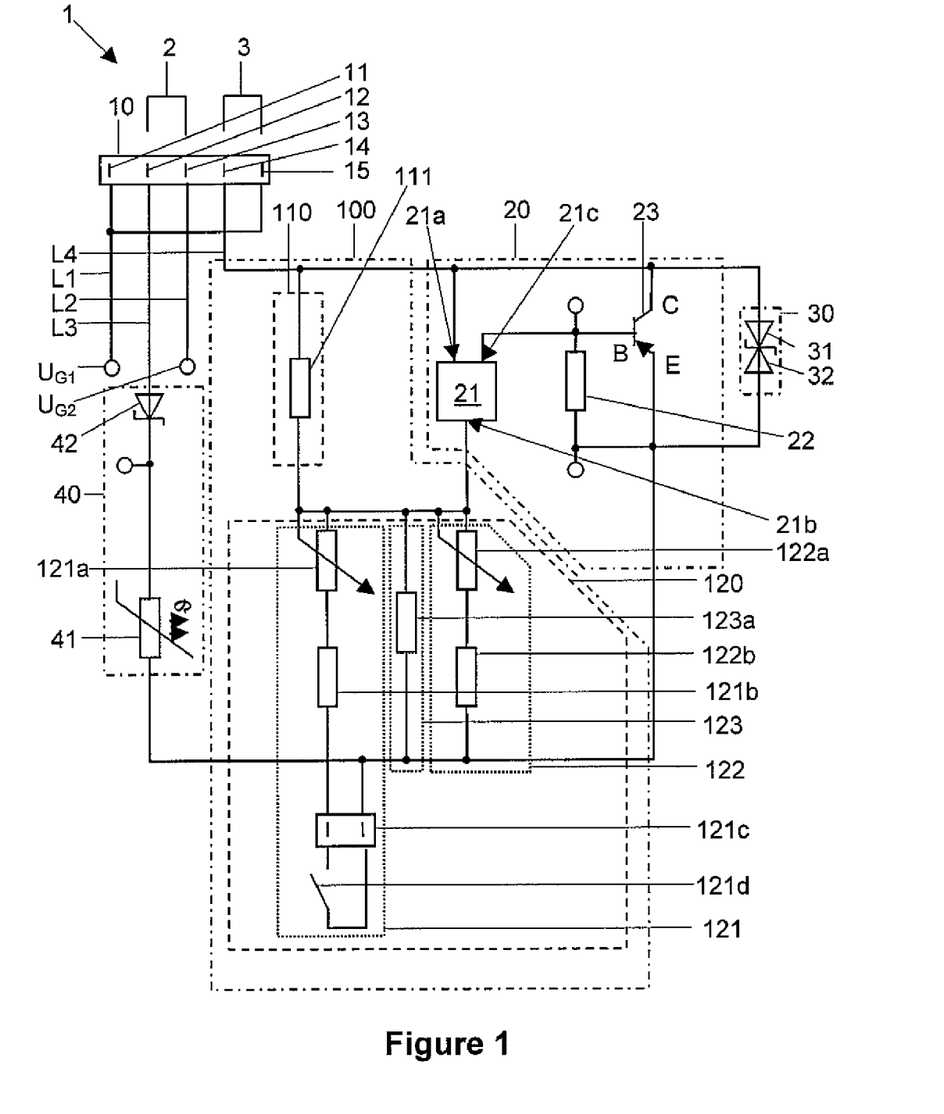
FIG. 1 is a braking circuit according to a first embodiment of the invention.

FIG. 1 is a braking circuit 1 according to a first embodiment of the invention. A non-illustrated electrical motor of a likewise non-illustrated door actuator is coupled by way of example to a terminal strip 10 via illustrated terminals $U_{G1}$, $U_{G2}$ and connecting leads L1, L2. In addition, internal connecting leads L3, L4, are connected to the rest of the braking circuit 1 at the terminal strip 10. By way of example, the terminal strip 10 comprises five terminals 11 to 15, respectively sockets, located next to each other. The internal connecting leads L3, L4 are coupled to the terminals 12, 14, between which the terminal 13 is located, and which are and directly adjacent and surrounded by two terminals 11, 13, respectively. One of the external connecting leads L1, L2 is coupled to two terminals 11, 15, which are respectively disposed at the end of the terminal strip 10 and directly adjacent to the terminals 12, 14. The other of the external connecting leads L2, L1, is connected to the terminal 13, which is located between the terminals 12, 14. Thereby, by connecting bridges 2, 3, each preferably having the same design, it is possible to selectively couple the internal connecting leads L3, L4 to the respective connecting lead L1, L2, as will be explained in the following.

The connecting lead L4 is coupled to both a direct voltage connector 21a of a voltage regulator 21 and to a collector C of a bipolar transistor 23. Furthermore, the connecting lead L4 is coupled to a resistive circuit 110, illustrated by a surrounding dashed line, which is coupled in parallel to the direct voltage connector 21a and to a reference voltage connector 21b of the voltage regulator 21. In the illustrated example, the resistive circuit 110 simply comprises one or more ohmic resistors 111.

Via a controlled voltage connector 21c, the voltage regulator 21 is coupled to the base B of the bipolar transistor 23.

The second internal connecting lead L3 is coupled to the emitter E of the bipolar transistor 23 and is electrically connected to the reference voltage connector 21b of the voltage regulator 21. The resistive circuit 110 supplies a reference voltage to the voltage regulator 21 at the reference voltage connector 21b, by which reference voltage the voltage regulator 21 controls the voltage applied to the direct voltage connector 21a to achieve an associated predetermined controlled voltage, which, via the controlled voltage connector 21c, is applied to the base B of the bipolar transistor 23. Based on the internal electrical resistance of the voltage regulator 21, the current applied to the base B of the bipolar transistor 23 is thus simultaneously controlled. As the base current determines the maximum current strength conducted across the collector-emitter section of the bipolar transistor 23, the energy, generatively produced by the electrical motor that can be maximally dissipated via the bipolar transistor 23 is thereby determined, e.g., the energy that can be transformed into thermal energy. This circumstance results in a controlled braking behavior and attenuation behavior of the braking circuit 1 with regard to the connected door.

The electrical connection of the internal connecting lead L3 to the reference voltage connector 21a of the voltage regulator 21 is preferably achieved via a second resistive circuit 120, again represented by a surrounding dashed line, which is coupled in parallel to the reference voltage terminal 21b of the voltage regulator 21 and to the emitter E of the bipolar transistor 23. The resistive circuits 110, 120 form a voltage divider 100, illustrated by the surrounding dash-dotted line, the center tap thereof being configured by interconnecting the resistive circuits 110, 120 to each other and being coupled to said reference voltage connector 21b of the voltage regulator 21. In the illustrated example, the bipolar transistor 23 is a PNP-bipolar transistor, wherein, between the reference voltage terminal 21c and the base B of the bipolar transistor 23, an additional resistor 22, as a pull-down resistor, is coupled in parallel to the base-emitter section of the bipolar transistor 23.

An additional safety circuit 30, illustrated by a surrounding dash-dotted line, is preferably coupled in parallel to the collector-emitter section of the bipolar transistor 23, which circuit, in the illustrated example, comprises two Zener diodes 31, 32, which are coupled to each other in series and have their forward directions opposing each other. In the event of a collector-emitter excess voltage at the bipolar transistor 23, which is higher than the respective breakdown voltage of the Zener diodes 31, 32, which are respectively coupled in reverse direction, the safety circuit 30 serves the purpose of conducting the electrical current to bypass the bipolar transistor 23. Even though the braking effect and the attenuation effect of the braking circuit 1 will abruptly increase, components of the braking circuit 1 will be neither destroyed nor damaged. In addition, this by-passing achieves that, on account of the closing force of a closer spring for example, a connected door can not be closed without being slowed down, whereby the risk for example for an individual of becoming trapped is at least considerably reduced. The safety circuit 30 serves as an excess voltage protection and is thus a reliability feature of the braking circuit 1. The risk of damaging components of the braking circuit 1 is thereby reliably prevented or minimized, which otherwise would require a possible exchange, resulting in cost and expenses.

The described electrical interconnection of voltage regulator 21, pull-down resistor 22 and bipolar transistor 23 thus forms a load resistance circuit 20, illustrated by the surrounding dash-dotted line, by which at least a portion of the energy, generatively produced by the electrical motor, is absorbed.

The resistive circuit 120 preferably comprises three resistive branches 121, 122, 123 coupled in parallel to each other and, in the illustrated example, are shown respectively by a surrounding dotted line. The first resistive branch 121, by way of example comprises two resistors 121a, 121b coupled in series to each other, one of them being adjustable by way of example, and being preferably configured as a potentiometer. In addition, this resistive branch 121 has a switch 121d, which by way of example is configured as a normally open contact and which is coupled in series to the two resistors 121a, 121b. Preferably, instead of the switch 121d, a terminal strip 121c is coupled in series to said resistors 121a, 121b. The switch 121d is preferably plugged in the terminal strip 121c. It is thereby possible to remove the switch 121d, if the resistive branch 121 is to be deactivated, or it can be permanently connected via an inserted non-illustrated connecting bridge line, similar to the connecting bridges 2, 3, such that the resistors 121a, 121b are constantly active for braking. By way of example the switch 121d has the function of a final latching switch 121d. If the respective door leaf to be slowed down is being closed and is located near its closed position, the switch 121d is preferably closed, such that the resistive branch 121 is switched on and thus the resistors 121a, 121b become active. This results in a higher overall current flowing across the resistive circuit 120. This leads to less current being conducted to the collector-emitter section. Thereby, the energy in the bipolar transistor 23 to be transformed into thermal energy drops, which results in a reduced braking effect and attenuation effect of the braking circuit 1. The braking circuit 1 achieves a lower resistance against the momentary movement of the connected door leaf, here in the closing direction.

In a door actuator, configured as a swing leaf drive, in which a door leaf is opened in the motor mode of operation and closed by the closer spring force, this results in the fact that, when closing the door, near the closed position, the resistance, effected by the braking circuit 1 and acting against the closing movement, decreases abruptly and thus the door actuator can apply more force on the door leaf in order to reliably maneuver it into the final closed position. This principle of the "disconnectable" braking resistance is the so-called final latching solution.

In the illustrated example, the second resistive branch 123 simply consists of an electrical, respectively ohmic resistor 123a.

The remaining resistive branch 122 consists by way of example of two resistors 122a, 122b coupled in series to each other, the resistor 122a being again preferably configured as a potentiometer.

Preferably a safety circuit 40 is coupled in series between the emitter E of the bipolar transistor 23 and the terminal strip 10, respectively the connecting lead L3. The safety circuit 40 mainly comprises a fuse 41 in the shape of a positive temperature coefficient resistor, such as an electrical component having an electrical resistance which increases with increasing temperature. In the event of exceeding a temperature in the braking circuit 1, respectively in the bipolar transistor 23, the fuse 41 serves the purpose of reducing the overall current running through the braking circuit 1, which results in the fact that the energy sinks, dissipated by the bipolar transistor 23 and by the braking circuit 1. As a result, the total resistance of the overall braking circuit 1 increases, which leads to a reduced braking effect, respectively attenuation effect of the braking circuit 1. The safety circuit 40 serves as an overheat protection for the braking circuit 1.

Therefore, the fuse 41 is positioned in a way to detect the generation of heat of the bipolar transistor 23.

Instead of a thermally influenceable resistor, likewise a switch can be used, for example in the shape of a bi-metal. In this case, a two-position control is achieved, in which the complete braking circuit 1 can only be either switched on or can be switched off.

The fuse 41 can alternately be configured by a more complex circuit, for example a series connection of a bi-metal switch and a positive temperature coefficient resistor. This circuit has the advantage that the braking circuit 1 does not abruptly loose its braking effect or attenuation effect on account of the positive temperature coefficient resistor, but can be completely switched off on account of the bi-metal switch.

In addition to the fuse 41, the safety circuit 40 preferably comprises furthermore a diode 42, coupled in series to the fuse 41, which diode furthermore is preferably configured as a Zener diode 42. The Zener diode 42 serves for the reverse polarity protection of the braking circuit 1.

In the example shown, coupling the internal connecting leads L3, L4 to the external connecting leads L1, L2 is accomplished via two preferably identically configured connecting bridges 2, 3. The connecting bridges 2, 3 are simply fitted onto the pairs of connecting leads 11, 12; 12, 13; 13, 14, respectively 14, 15 of the terminal strip 10 (in this case: 12, 13 and 14, 15), which are to be coupled.

Figure 2:
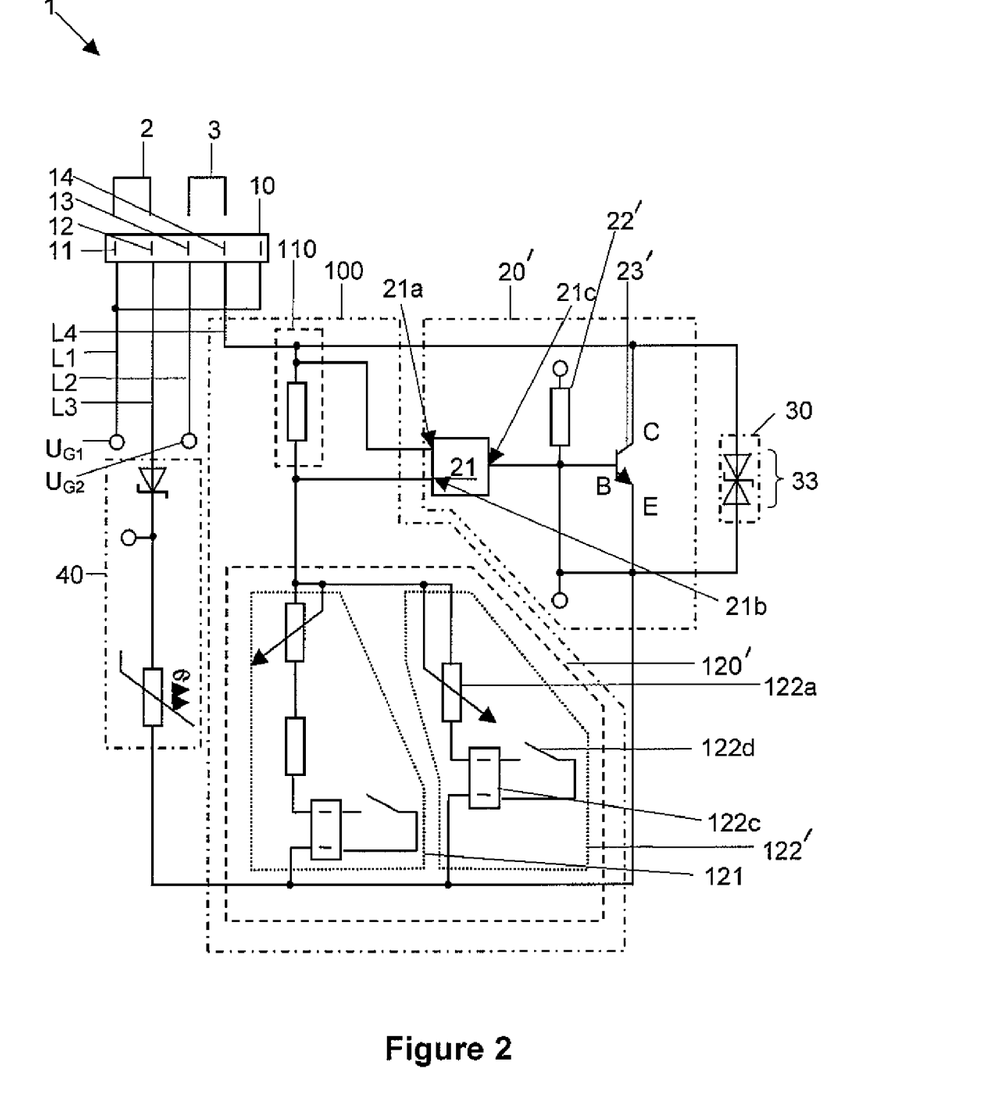
FIG. 2 is a braking circuit according to a second embodiment of the invention.

FIG. 2 shows a braking circuit 1' according to a second embodiment of the invention, which is modified with regard to the first embodiment. As can be seen, in this case, the connecting bridges 2, 3 couple the terminals 11, 13 to the respective terminal 12, 14. The direction of the electrical current, supplied externally from the electrical motor, is reversed when compared to the first embodiment of the invention. The function of electrically interconnecting the external and internal connecting leads L1, L2, L3, L4 to the terminal strip 10 becomes thus evident. As each terminal 12, 14, in this case for the internal lines, is respectively neighboured by two terminals 11, 13, respectively 13, 15, which are respectively connected to one of the respective external connecting leads L1, L2, it is possible to keep the direction of the current in the braking circuit 1 by simply plugging in the connecting bridges 2, 3, however having the possibility of adapting it to the direction of rotation of the electrical motor in the generator mode of operation.

The advantage of this solution is that the electrical interconnection of the braking circuit 1 and the connecting leads L1, L2 to the electrical motor remains the same, namely if offers the possibility of being able to utilize one and the same braking circuit 1' for both directions of rotation of the generatively operated electrical motor.

Braking circuit 1' comprises a load resistance circuit 20' and a voltage divider 100'. The resistive circuit 120' of the voltage divider 100' comprises simply two resistive branches 121, 122'. The resistive branch 121 is configured identical to the resistive branch 121 according to the first embodiment of the invention. In addition to an adjustable resistor 122a, the resistive branch 122' comprises a switch connection, which is similar to the resistive branch 121. The resistor 122a is preferably coupled in series to a terminal strip 122c, into which a switch 122d is plugged, which is preferably configured as a normally closed contact. It is thereby possible to define a second opening range for the connected door, for which the braking effect, respectively the attenuation effect of the braking circuit 1 is modified, here by closing and opening the switch 122d.

Unlike in the first embodiment of the invention, the bipolar transistor 23 by way of example is configured as a NPN-bipolar transistor. Instead of a pull-down resistor, a resistor 22', configured as a pull-up resistor, is coupled between the controlled voltage output 21c of the voltage regulator 21 and the base B of the bipolar transistor 23', as well as parallel to the base-collector section of the bipolar transistor 23'.

Furthermore, instead of two Zener diodes 31, 32, an SMD protective diode 33 is utilized, by way of example the type SM6T30CA.

Figure 3:
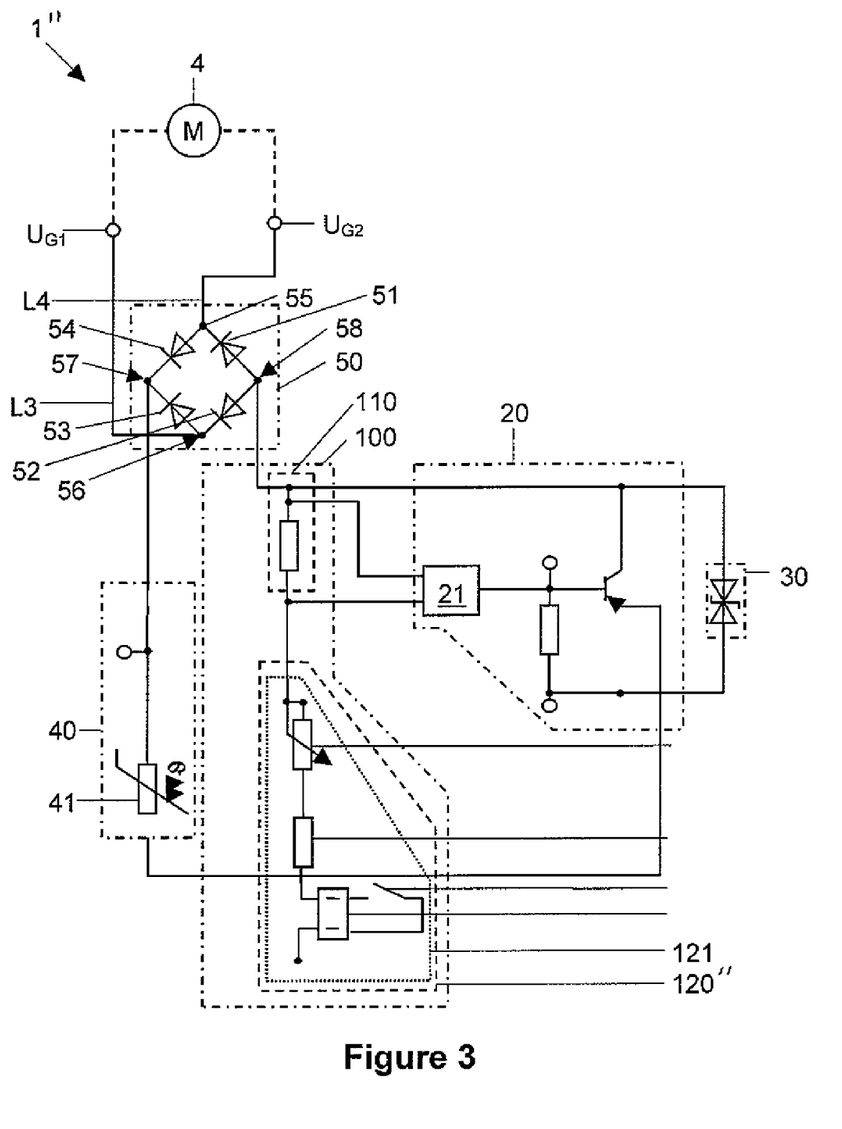
FIG. 3 is a braking circuit according to a third embodiment of the invention.

FIG. 3 is a braking circuit 1'' according to a third embodiment of the invention. As can be seen, the internal connecting leads L3, L4 are connected to rectifier connectors, respectively to general power supply connectors 55, 56 of a rectifier 50, surrounded by the dash-dotted line. The braking circuit 1'' is coupled to the remaining direct voltage connectors 57, 58 of the rectifier 50. The rectifier 50 is preferably configured by a Graetz bridge, namely, according to FIG. 3, it has four diodes 51 to 54 in a cross-coupling. In both directions of rotation of the electrical motor 4 connected via the terminals $U_{G1}$ and $U_{G2}$, it is thereby possible to achieve an appropriate braking effect, respectively attenuation effect and to generatively operate the motor, if required, in both directions of rotation with an appropriate braking effect, respectively attenuation effect. This is especially useful with door operators, in which the voltage supply has failed, such that the electrical motor 4 can no longer be operated. The connected door leaf can still be manually opened and closed (against the force of the electrical motor 4). In this case, the braking circuit 1 also effects a braking, respectively attenuation in both the opening and the closing direction of the door leaf, a feature which increases the safety of operation, despite the drive being out of order. Apart from the rectifier 50, the braking circuit 1 essentially corresponds to the structure according to the first embodiment of the invention. However in this case, the resistive circuit 120'' has only one resistive branch 121, which includes a potentiometer-resistance-terminal-strip-circuit according to the first embodiment of the invention. In addition in this case, the Zener diode 42 can be omitted, because the rectification is assumed by the rectifier 50. In addition, the terminal strip 10 is omitted in the braking circuit 1 shown. The electrical motor 4 is coupled directly to the internal connecting leads L3, L4, via the terminals $U_{G1}$, $U_{G2}$. Thus, the external connecting leads L1, L2 can be omitted, which simplifies the braking circuit 1".

Figure 4:
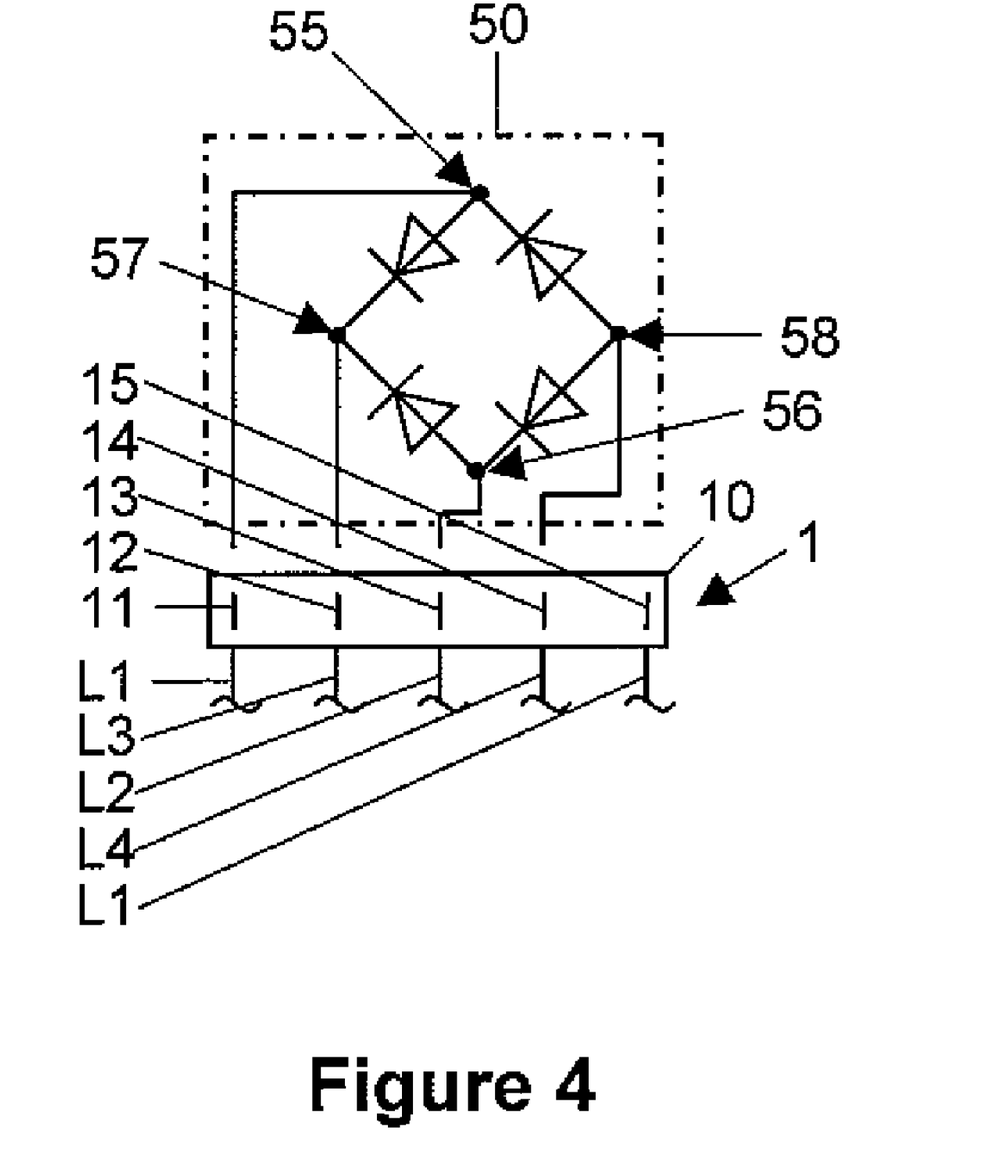
FIG. 4 is a modification of a terminal strip of FIGS. 1 to 3.

In the partial braking circuit 1 illustrated in FIG. 4, the connecting leads L1 to L4 are preferably coupled to the terminal strip 10 according to the first embodiment of the invention. However in this case, instead of the connecting bridges 2, 3 a rectifier 50 is provided, configured as a diagrammatically illustrated module, which rectifier is adapted to be inserted into the terminal strip 10, and namely in both configurations shown in FIGS. 1 and 2. For this purpose, the general power supply connectors 55, 56 of the rectifier 50, by way of example, are respectively coupled to one of the terminals 11, 13 of the terminal strip 10, whereas the direct voltage connectors 57, 58 are coupled to the terminals 12, 14 of the terminal strip 10. It is thereby possible to likewise equip the braking circuits 1 according to the first and second embodiments of the invention with a rectifier 50, without having to manipulate the braking circuit 1 itself; just the connecting bridges 2, 3 have to be exchanged for the rectifier module. The braking circuit 1 is thereby almost universally applicable, depending in which direction of rotation of the connected electrical motor a braking effect, respectively an attenuation effect is to be achieved.

The invention is not limited to the above embodiments. For example the rectifier 50 can be utilized, respectively incorporated in all shown circuits.

If not required, the safety circuits 30, 40 can be omitted.

The resistive circuit 110, 120 of the voltage divider 100 can be configured similar to the respective other resistive circuit 120, 110. It is likewise possible to dispose the resistive circuits 110, 120, in the Figures, below the center tap of the voltage divider 100.

The terminal strip 10 can be exchanged for the coupling according to FIG. 3. Likewise the coupling according to FIG. 3 can be replaced by a terminal strip 10.

As a result, the invention provides a universally applicable, fast responding braking circuit 1 for a generatively operated electrical motor 4 of a door actuator.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

I claim:

1. A braking circuit for a door actuator, configured to influence a movement of a connected door in at least one direction of movement, having at least one electrical motor, the braking circuit comprising:
a bipolar transistor configured to be supplied when the electrical motor is generatively operated in a first direction of operation opposite to the one direction of movement with the generatively produced energy as a load resistance;
a voltage regulator configured to control a voltage applied to a base terminal of the bipolar transistor the applied voltage based at least in part on a generator voltage produced in the electrical motor providing an associated control voltage based at least in part on a reference voltage, comprising:
a reference input for the reference voltage;
a voltage input for the applied voltage; and
an output for outputting the control voltage applied to the base terminal of the bipolar transistor;
a first power supply connector coupled to a collector terminal of the bipolar transistor and to the voltage input of the voltage regulator;
a second power supply connector coupled to an emitter terminal of the bipolar transistor; and
a first resistive branch comprising at least one electrical resistor, coupled to the reference input of the voltage regulator.

2. The braking circuit according to claim 1, wherein the first resistive branch is a portion of a first voltage divider coupled in parallel to the collector-emitter of the bipolar transistor,
a center tap of the voltage divider coupled to the reference voltage input of the voltage regulator; and
the first resistive branch, coupled in series to a second voltage divider section of the voltage divider.

3. The braking circuit according to claim 2, wherein the second voltage divider section comprises:
a second resistive branch;
a switch; and
an electrical resistor coupled in series to the switch.

4. The braking circuit according to claim 3, wherein the second voltage divider section comprises at least one third resistive branch coupled in parallel to the second resistive branch.

5. The braking circuit according to claim 4, wherein at least one of the resistive branches of the voltage divider comprises an adjustable resistor.

6. The braking circuit according to claim 5, wherein the at least one adjustable resistor is a potentiometer.

7. The braking circuit according to claim 1, further comprising a fuse coupled in parallel to the collector-emitter section of the bipolar transistor.

8. The braking circuit according to claim 7, wherein the fuse comprises one of:
two Zener diodes coupled in series to each other having their forward directions opposed to each other, and
a protective diode.

9. The circuit for a door actuator according to claim 1, comprising:
a bipolar transistor configured to be supplied when the electrical motor is generatively operated in a first direction of operation opposite to the one direction of movement with the generatively produced energy as a load resistance;
a voltage regulator configured to control a voltage applied to a base terminal of the bipolar transistor based at least in part on a generator voltage produced in the electrical motor providing an associated control voltage based at least in part on a reference voltage, comprising:
a reference input for applying the reference voltage;
a voltage input for the generated voltage; and
an output for outputting the control voltage applied to the base terminal of the bipolar transistor;
a first power supply connector coupled to a collector terminal of the bipolar transistor and to the voltage input of the voltage regulator;

a second power supply connector coupled to an emitter terminal of the bipolar transistor; and,
a first resistive branch comprising at least one electrical resistor, is coupled to the reference input of the voltage regulator,
a drive circuit configured to operate the electrical motor in a motor mode of operation in a second direction of operation which is opposite to the first direction of operation; and
a switch-over device, adapted to switch over between the drive circuit and the braking circuit.

10. A door actuator, comprising:
an electrical motor, configured to be generatively operated in a first direction of operation, and a braking circuit comprising:
a bipolar transistor configured to be supplied when the electrical motor is generatively operated in a first direction of operation opposite to the one direction of movement with the generatively produced energy as a load resistance;
a voltage regulator configured to control a voltage applied to a base terminal of the bipolar transistor based at least in part on a generator voltage produced in the electrical motor providing an associated control voltage based at least in part on a reference voltage, comprising:
a reference input for applying the reference voltage;
a voltage input for the generated voltage; and
an output for outputting the control voltage applied to the base terminal of the bipolar transistor;
a first power supply connector coupled to a collector terminal of the bipolar transistor and to the voltage input of the voltage regulator;
a second power supply connector coupled to an emitter terminal of the bipolar transistor; and
a first resistive branch comprising at least one electrical resistor, is coupled to the reference input of the voltage regulator.

* * * * *